June 15, 1971   H. F. DE LUCA   3,585,221
25-HYDROXYERGOCALCIFEROL

Filed March 24, 1969   2 Sheets-Sheet 1

INVENTOR.
HECTOR F. DE LUCA
BY
Howard W. Bremer
ATTORNEY

June 15, 1971   H. F. DE LUCA   3,585,221
25-HYDROXYERGOCALCIFEROL
Filed March 24, 1969   2 Sheets-Sheet 2

25-HYDROXYERGOCALCIFEROL

INVENTOR.
HECTOR F. DE LUCA
BY
Howard W. Bremer
ATTORNEY

United States Patent Office 3,585,221
Patented June 15, 1971

---

3,585,221
25-HYDROXYERGOCALCIFEROL
Hector F. De Luca, Madison, Wis., assignor to Wisconsin Alumni Research Foundation, Madison, Wis.
Filed Mar. 24, 1969, Ser. No. 809,541
Int. Cl. C07c *171/10*
U.S. Cl. 260—397.2      1 Claim

ABSTRACT OF THE DISCLOSURE 25-hydroxyergocalciferol. The compound is characterized by vitamin-D-like activity and is therefore suitable as an animal feed supplement.

---

This invention relates to a compound which is characterized by vitamin-D-like activity and to a process for making it.

More specifically, this invention relates to a derivative of vitamin $D_2$.

The antirachitic activity of the D vitamins, more specifically, vitamins $D_2$ and $D_3$, is well known and amply documented. Also, the application of these vitamins as nutritional supplements is well established.

A derivative of vitamin $D_2$ has now been found which exhibits greater biological activity than vitamin $D_2$. This derivative has been identified as 25-hydroxyergocalciferol.

ISOLATION

Figure 1:
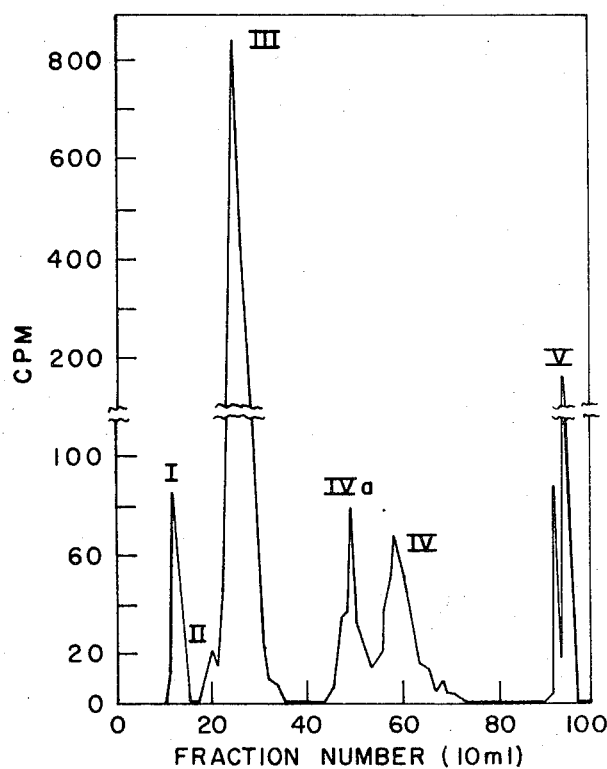
FIG. 1 is the radioactivity profile on a silicic acid chromatographic column of tritiated hog plasma derived from the blood of hogs which were fed rations containing large amounts of vitamin $D_2$.

Four hogs of mixed breed weighing from 165–200 pounds were fed stock rations to which sufficient water-dispersible vitamin $D_2$ had been added to give 70,000 International Units (I.U.) of vitamin $D_2$ per pound of feed. This supplemented ration supplied each hog with 500,000 I.U. of vitamin $D_2$ daily. After the hogs had been on the vitamin $D_2$-supplemented ration for 26 days their blood was collected and immediately mixed with one-tenth of its volume with 0.1 M sodium oxalate to prevent clotting. The cells were separated from the blood by centrifugation, the plasma obtained (4.1 liters) was treated with sufficient ammonium sulfate to achieve a 70% saturation and the treated plasma allowed to stand at 4° C. for 7 days to precipitate the serum proteins. The precipitate was collected by centrifugation equivalent to centrifuging at 25,000 r.p.m. for 25 minutes in a Sharples Company AS–16–P centrifuge. The precipitate was extracted with 6.6 liters of a 2:1 mixture of methanol: chloroform and allowed to stand for 24 hours after which an additional 2.2 liters of chloroform was added with stirring. The denatured protein was removed by filtration through glass wool and reextracted with another 4.4 liters of the methanol:chloroform mixture after which the combined filtrates were allowed to separate into an aqueous (methanol) phase and a chloroform phase. The aqueous phase was drawn off and reextracted with 2 liters of chloroform again followed by settling. The chloroform layers were all combined, washed with 10 liters of water, allowed to stand for 24 hours and were concentrated on a rotary flash evaporator to 50 ml. of an oil black residue. This residue was washed with saturated sodium chloride and dried over anhydrous magnesium sulfate. It was taken to dryness on a rotary flash evaporator and then dissolved in 100 ml. of Skelly B (Skellysolve B, straight run aliphatic naphthas (essentially normal hexane) derived from petroleum oil and marketed by Skelly Oil Company, having a boiling point of from about 65–67° C.).

Separation of the desired fractions of the plasma by chromatographic means initially required the establishment of a radioactivity profile for the plasma. This was accomplished as follows:

Radiochemically pure $^3$H-vitamin $D_2$ was prepared by exposing 1 g. of vitamin $D_2$ to 3.0 Ci of tritiated acetic for two weeks after which is was chromatographed three times on a multibore silicic acid column and once on a reversed phase column to constant specific activity. The $^3$H-vitamin $D_2$ had a specific activity of 1200 DPM/I.U. or 8.6 mc./m. mole. (See Neville, P. and De Luca, H. F. (1966), Biochemistry, 5, 2201, for description of the columns and for method for establishing radioactive purity.)

Ten rats, each weighing about 400 g. and fed a low vitamin D stock ration (as described in Steenbock, H. (1923), Science, 58, 449) were given 10,000 I.U. $^3$H-vitamin $D_2$ intraperitoneally in 0.1 ml. of ethanol. Twenty-four hours later blood was drawn by cardiac puncture and centrifuged to produce 40 ml. of plasma. The plasma was extracted with a 2:1 methanol:chloroform mixture as described by Blunt et al. in Biochemistry, 7, 3317 (1968), the chloroform extract was dried over anhydrous sodium sulfate and evaporated to dryness in a flash evaporator. The resulting residue was dissolved in Skelly B and combined with the extract obtained from the hog blood above.

The combined extract was divided into five equal aliquots and each aliquot was chromatographed on a silicic acid column as described in the Blunt et al. article supra. The radioactivity profile of the extract in such a column is shown in FIG. 1 where the peak identified by III represents unchanged vitamin $D_2$. The fractions (10 ml. each) under each of the peaks were combined and tested for biological activity (antirachitic) by the "line test" rickets cure test in rats (U.S. Pharmacopoeia 1955). The peak IV fractions were about 1.5 times more active than the peak III fractions while the fractions under peaks I, II, IVa and V showed little if any biological activity.

Figure 2:
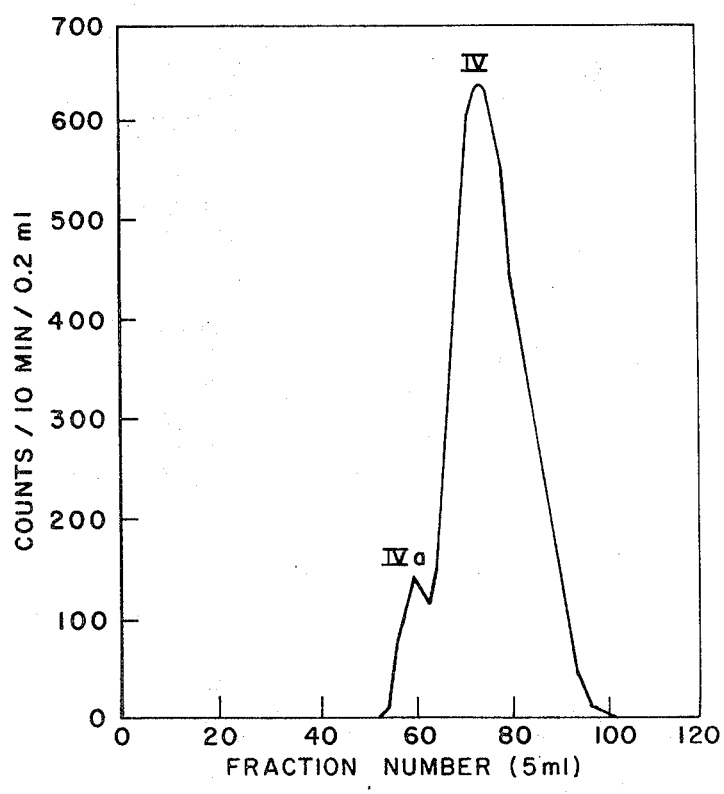
FIG. 2 is the radioactivity profile on a silicic acid chromatographic column of the peak IV fractions shown in FIG. 1.

The peak IV fractions from the five aliquots were collected, evaporated to dryness in a flash evaporator and rechromatographed on a multibore silicic acid column as described in the Neville and De Luca reference supra except that the mixing chamber contained 250 ml. of Skelly B and the holding chamber contained 400 ml. of 85% diethyl ether in Skelly B. As soon as the holding chamber became empty it was filled with 300 ml. 100% diethyl ether. The elution profile of these combined fractions, based upon 5 ml. fractions, is shown in FIG. 2 where the IVa peak is still evident.

Figure 3:
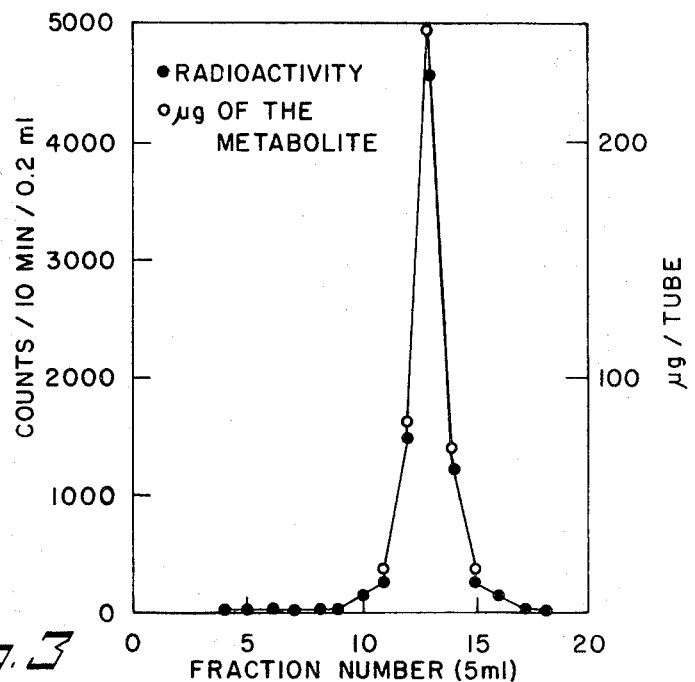
FIG. 3 is the radioactivity profile on a Celite chromatographic partition column of the peak IV fractions shown in FIG. 2.

Fractions 63–98 were combined, flashed evaporated, and chromatographed on a Celite (a diatomaceous silica product marketed by Johns-Manville Company) partition column as follows:

200 ml. of Skelly B was equilibrated with an equal volume of 80% methanol: 20% water. 20 grams of Celite was mixed with 15 ml. of the methanolic phase and dry packed into a 60 x 1 cm. column in 2 cm. portions. The upper phase was used as the mobile phase. The combined fractions were applied to the column in 1–3 ml. of the mobile phase and the column was developed with mobile phase. 5 ml. fractions were collected. Fractions numbers 11–17 were recombined, evaporated to dryness and rechromatographed on another identical partition column. The radioactivity profile from that column is shown in FIG. 3.

All determinations of radioactivity were carried out by means of a Packard Tri-Carb Model 3003 liquid scintillation counter equipped with an automatic external standardization system. Samples to be counted were evaporated to dryness with a stream of air, dissolved in toluene counting solution (2 g. of 2,5-diphenyloxazole and 100 mg. 1,4-bis[2-(4-methyl-5-phenyloxazolyl) benzene] per liter of toluene) and counted.

IDENTIFICATION

For the purpose of identification it was necessary to prepare the tetramethylsilyl ether derivative of the peak IV material. Thirty μg. of the isolated material was taken to dryness under a stream of dry nitrogen. A few drops of a reagent (14 ml. dry pyridine, 4 ml. hexamethyl disilazane and 2 ml. trimethyl silyl chloride) was added, flushed with nitrogen and the mixture was allowed to stand in the dark at room temperature for 3 hrs. Three ml. Skelly B was added followed by 2 ml. 10% $H_2SO_4$. The mixture was vigorously mixed and then allowed to separate. The Skelly B phase was dried over a small amount of anhydrous $Na_2SO_4$. It was then chromatographed on silicic acid column as described by Lund et al. in Arch. Biochem. Biophysics, 120, 513 (1967). In tubes 19–27 the disilyl ether derivative was located (15 μg.) and was found to be essentially pure by gas-liquid chromatography. It was then used for determination of mass spectra.

Ultraviolet spectra and GLC data clearly suggest that the triene structure of vitamin $D_2$ exists in the peak IV material. The mass spectrum of the peak IV material shows intense peaks at $m/e$ 136 ($C_9H_{12}O$) and 118 ($C_9H_{10}$) deriving from ring A of the molecule including C–6 and 7 and are present also in the spectrum of vitamin $D_2$.

The mass spectrum of the peak IV material indicated a molecular ion of $m/e$ 412, the increase of 16 mass units over the molecular weight of vitamin $D_2$ suggesting the incorporation of an additional oxygen atom. Confirmation was provided by the high resolution mass spectrum, since the exact mass of the molecular ion—412.3341—required the composition of $C_{28}H_{44}O_2$ (calc. 412.3341). The location of the additional oxygen substituent in the side chain is apparent from comparison of the spectra of vitamin $D_2$ and the peak IV material. Both show peaks at $m/e$ 271 ($C_{19}H_{27}O$—271.2065, by high resolution mass spectrometry) resulting from loss of the entire side chain by cleavage of the $C_{17}$–$C_{20}$ bond. In addition the high resolution spectrum of the peak IV material contains minor peaks which are probably due to the side chain itself: $m/e$ 141.1255 ($C_9H_{17}O$) and 123.1181 ($C_9H_{15}$).

A fragment of mass 59 ($C_3H_7O$, as determined by high resolution mass spectrometry) and the elimination of 58 mass units from the molecular ion to give a peak at $m/e$ 354 (354.2900—$C_{25}H_{38}O$) both present in the mass spectrum of the peak IV material, but absent in that of vitamin $D_2$, provided evidence for a hydroxyl function at C–25. The former peak would arise by simple cleavage of the C24/25 bond to give the ion

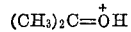

the latter by hydrogen rearrangement with elimination of the elements of acetone, a process not uncommon for homoallylic alcohols.

Proof of the position of the hydroxyl grouping was obtained from the mass spectrum of the silyl ether derivative of the peak IV material which exhibited a molecular ion at $m/e$ 556, as required for a di-trimethyl-silyl ether, and the expected intense peak at $m/e$ 131 (base peak), shown to correspond to $C_6H_{15}SiO$,

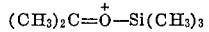

by high resolution mass spectrometry. This peak, which also occurs in the spectra of the trimethylsilyl ether derivatives of 25-hydroxycholesterol and 25-hydroxycholecalciferol but not in the spectra of the silyl ethers of vitamin $D_2$ or $D_3$, thus requires C–25 as the position of the additional hydroxyl function.

Figure 4:
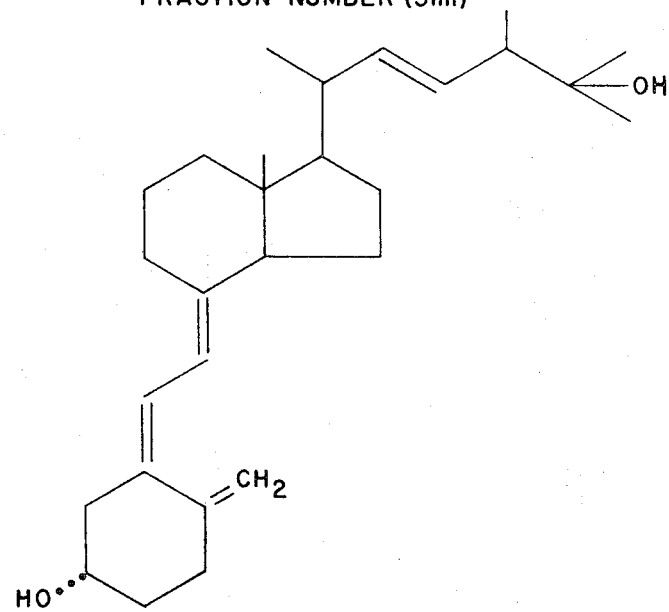
FIG. 4 is a structural representation of 25-hydroxyergocalciferol.

The NMR spectrum of the peak IV material which were recorded in $CDCl_3$ solution using a Varian Associates Model HA–100 spectrometer coupled to a time-averaging computer because of the small amount of peak IV material isolated, and using tetramethylsilane as the internal standard, fully corroborated these deductions and provided independent structural evidence. Data are presented as δ in parts per million relative to tetramethylsilane (δ=0). An intense singlet at δ1.24 p.p.m. can be assigned to the two methyl groupings at C–25, while two doublets at δ0.79 (J=6.5 cps.) and 0.81 p.p.m. (J=7.0 cps.) must be due to the remaining methyl substituents of the side chain (C–21 and 28). The spectra of 25-hydroxycholesterol and 25-hydroxycholecalciferol exhibit a singlet for the C–26, 27 methyl groups at essentially the same position (δ1.20 p.p.m.). It should be noted that two doublets at δ0.87 (J=7.0 cps.) and δ0.98 (J=6.0 cps.) originally present in the ergocalciferol spectrum are absent in that of the peak IV material. This elimination of two doublets which must correspond to two methyl groups can be explained only by hydroxyl substitution at C–25. The remaining identifiable feature is the singlet due to the C–18 angular methyl group. These data, therefore, establish the structure of the peak IV material as 25-hydroxyergocalciferol (FIG. 4).

The high resolution mass spectra were obtained with an Associated Electrical Industries model MS–9 spectrometer coupled with a Scientific Data Systems Sigma-7 model computer.

Further detailed data for identification purposes may be obtained from "The Isolation and Identification of 25-Hydroxyergocalciferol" by T. Suda, H. F. De Luca, H. K. Schnoes and J. W. Blunt (in print).

BIOLOGICAL ACTIVITY

Line test assay or rickets cure test

Weanling rats were fed the rachitogenic diet of Steenbock and Black, J. Biol. Chem., 64, 263 (1925) for 21 days. The diet was modified by the addition of water-soluble vitamins described in De Luca et al., J. Nutr., 75, 175 (1961). After the 21 day depletion period a single 0.25 μg. dose of either standard vitamin $D_2$ or the peak IV material was administered. Seven days later the rats were sacrificed and the line test was performed on sectioned radii and ulnae of individual rats. The biological activity was ascertained as described in U.S. Pharmacopeia, 14th revision [Mack Publishing Co., Easton, Pa. (1955)].

Routinely the peak IV material, 25-hydroxyergocalciferol, gave a value of about 60 I.U. per μg. whereas vitamin $D_2$ gave values of only about 40 I.U. per μg.

Calcium transport by everted intestinal sacs

Male weanling rats were maintained in hanging wire cages and fed ad libitum a purified vitamin D-deficient diet as described in De Luca et al., J. Nutr., 75 supra. This diet does not induce rickets in rats but produces a severe vitamin D deficiency in 3–4 weeks characterized by low serum calcium and reduced growth Steenbock, H. and Herting, D. C., J. Nutr., 57, 449 (1955).

After being on the above diet for 5–6 weeks the rats were dosed intrajugularly with 0.25 μg. of vitamin $D_2$ ($D_2$) or the peak IV material (25–OH–$D_2$) in 0.02 ml. of ethanol. The controls received an injection of 0.02 ml. of 95% ethyl alcohol intravenously. After the times indicated in the following table the rats were sacrificed and calcium transport by everted intestinal sacs was carried out in accordance with the procedures of Zull, J. E., et al., Science, 149, 182 (1965). The results indicated in the table below were obtained with the calcium transport expressed as a ratio of $^{45}$Ca(serosal side)/$^{45}$Ca(mucosal side).

TABLE I

| Hours after administration | Transport ratio | |
|---|---|---|
| | $D_2$ | 25-OH-$D_2$ |
| Control | 1.50±0.14(25)* | |
| 3 | 1.40±0.39(5) | 1.94±0.41(5) |
| 4 | 1.54±0.36(5) | 2.09±0.65(5) |
| 6 | 1.88±0.30(4) | 2.74±0.49(5) |
| 8 | 2.06±0.12(5) | 3.51±0.23(5) |
| 12 | 3.35±0.70(5) | 3.58±0.59(5) |

*Number in parentheses indicates number of rats in group.

It is evident from the foregoing data that the 25-OH-$D_2$ initiates the onset of calcium transport in the intestine much more rapidly than does vitamin $D_2$.

Serum calcium response (bone mobilization)

Male weanling rats were fed the vitamin D-deficient diet described in De Luca et al., J. Nutr., 75 supra for 3–4 weeks except that calcium was eliminated from the diet. The rats were then dosed intrajugularly with 2.5 μg. of vitamin $D_2$ or 25-OH-$D_2$ each in 0.02 cc. of ethanol. The controls received ethanol only. Serum was collected from the animals at the times indicated in the table below and assayed for calcium by the method of Webster, Am. J. Clin. Pathol., 131, 330 (1960). All assays were conducted in duplicate with the results shown in the table.

TABLE II

| Hours after administration | Serum Ca (mg. percent) | |
|---|---|---|
| | $D_2$ | 25-OH-$D_2$ |
| Control | 3.7±0.2(6)* | |
| 4 | 3.7±0.5(4) | 4.3±0.3(4) |
| 8 | 3.7±0.3(4) | 4.6±0.3(5) |
| 12 | 3.6±0.3(4) | 4.8±0.3(5) |
| 16 | 4.2±0.1(3) | 5.1±0.2(4) |
| 24 | 5.7±0.3(6) | 6.0±0.4(6) |

*Number in parentheses indicates number of rats in group.

It is evident from the foregoing that the 25-OH-$D_2$ induces bone mobilization (increase in serum calcium) much more quickly than does vitamin $D_2$.

It is clear from the foregoing that 25-hydroxyergocalciferol, is, on a weight basis, more effective in curing rickets in rats than vitamin $D_2$ and that it induces a more rapid onset of intestinal transport of calcium and of bone mobilization in animals after administration than vitamin $D_2$. Since the rickets cure test (line test) in rats is the accepted measurement for antirachitic activity (vitamin D-like activity) of materials for nutritional purposes and since 25-hydroxyergocalciferol exhibits excellent antirachitic activity in such test it is evident that 25-hydroxyergocalciferol can be substituted as a nutritional supplement wherever vitamin $D_2$ is now utilized, such as for example in animal feeds.

Having thus described the invention what is claimed is:
1. 25-hydroxyergocalciferol.

No references cited.

ELBERT L. ROBERTS, Primary Examiner

U.S. Cl. X.R.

195—51